(12) United States Patent
Tan et al.

(10) Patent No.: US 8,749,485 B2
(45) Date of Patent: Jun. 10, 2014

(54) USER CONTROL GESTURE DETECTION

(75) Inventors: Desney S. Tan, Kirkland, WA (US);
Shwetak Patel, Seattle, WA (US);
Daniel S. Morris, Bellevue, WA (US);
Sidhant Gupta, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 159 days.

(21) Appl. No.: 13/332,348

(22) Filed: Dec. 20, 2011

(65) Prior Publication Data

US 2013/0154919 A1 Jun. 20, 2013

(51) Int. Cl.
*G06F 3/033* (2013.01)
(52) U.S. Cl.
USPC ........................................................ 345/156
(58) Field of Classification Search
None
See application file for complete search history.

(56) References Cited

U.S. PATENT DOCUMENTS

| | | | |
|---|---|---|---|
| 7,129,927 B2 | 10/2006 | Mattsson | |
| 8,223,589 B2 * | 7/2012 | Liu | 367/96 |
| 8,276,453 B2 * | 10/2012 | Chang et al. | 73/627 |
| 8,421,752 B2 * | 4/2013 | Deluca | 345/158 |
| 2007/0121097 A1 | 5/2007 | Boillot | |
| 2007/0211022 A1 | 9/2007 | Boillot | |
| 2009/0150160 A1 | 6/2009 | Mozer | |
| 2009/0273583 A1 * | 11/2009 | Norhammar | 345/177 |
| 2010/0202656 A1 | 8/2010 | Ramakrishnan et al. | |
| 2011/0103448 A1 | 5/2011 | Dahl et al. | |
| 2011/0181509 A1 | 7/2011 | Rautiainen et al. | |
| 2011/0181510 A1 | 7/2011 | Hakala et al. | |
| 2012/0001875 A1 * | 1/2012 | Li et al. | 345/177 |

FOREIGN PATENT DOCUMENTS

WO WO 2009122193 A1 * 10/2009

OTHER PUBLICATIONS

Kalgaonkar, et al., "One-Handed Gesture Recognition Using Ultrasonic Doppler Sonar", Retrieved at <<http://ieeexplore.ieee.org/stamp/stamp.jsp?arnumber=04959977>>, IEEE International Conference on Acoustics, Speech and Signal Processing (ICASSP), Apr. 19-24, 2009, pp. 1889-1892.

Kuang, Cliff, "Samsung Unveils Gesture-Sensing Hologram, but It's Not World's First", Retrieved at <<http://www.fastcompany.com/blog/cliff-kuang/design-innovation/samsung-invents-worlds-first-gesture-sensing-hologram>>, Jul. 22, 2009, pp. 3.

Raes, Dr., Godfried-Willem , "Gesture controlled virtual musical instruments", Retrieved at <<http://logosfoundation.org/ii/gesture-instrument.html>>, Retrieved Date: Oct. 17, 2011, p. 1.

Goina, et al., "Elementary Gestalts for Gesture Sonification", Retrieved at <<http://rice.iuav.it/167/1/Goina.pdf>>, International Conference on New Interfaces for Musical Expression, Jun. 4-8, 2008, pp. 4.

(Continued)

*Primary Examiner* — Jason Olson
(74) *Attorney, Agent, or Firm* — Steve Wight; Carole Boelitz; Micky Minhas

(57) ABSTRACT

The description relates to user control gestures. One example allows a speaker and a microphone to perform a first functionality. The example simultaneously utilizes the speaker and the microphone to perform a second functionality. The second functionality comprises capturing sound signals that originated from the speaker with the microphone and detecting Doppler shift in the sound signals. It correlates the Doppler shift with a user control gesture performed proximate to the computer and maps the user control gesture to a control function.

24 Claims, 6 Drawing Sheets

(56) References Cited

OTHER PUBLICATIONS

Paradiso, et al., "The Magic Carpet: Physical Sensing for Immersive Environments", Retrieved at <<http://media.mit.edu/resenv/pubs/papers/97_03_CHI97_Floor.pdf>>, Presented at the ACM SIGCHI Conference, CHI EA CHI extended abstracts on Human factors in computing systems: looking to the future, Mar. 25-27, 1997, pp. 2.

Tarzia, et al., "Sonar-based Measurement of User Presence and Attention", Retrieved at <<http://empathicsystems.org/Papers/ubicomp09.pdf>>, Proceedings of the 11th international conference on Ubiquitous computing, Sep. 30-Oct. 3, 2009, pp. 4.

D'Ambrose, C. "Frequency Range of Human Hearing". The Physics Factbook 2003.

Ditchburn, R.W. "Light", 1961, 1991. Dover publications Inc., pp. 331-333.

"International Search Report", Mail Date: Mar. 22, 2013, Application No. PCT/US2012/069030, Filed date: Dec. 12, 2012, pp. 10.

Gupta, S. et al.; "SoundWave: Using the Doppler Effect to Sense Gestures"; CHI 2012; May 5-10, 2012; Austin, TX; pp. 1911-1914.

* cited by examiner

USER CONTROL GESTURE DETECTION

BACKGROUND

Computers are ubiquitous in everyday life. However, instead of having 'a computer', users tend to have, or interact with, lots of different computers. For instance, a typical user may have a desktop computer at work, a laptop at home, a Smartphone, a pad computer, a video game console, and/or an electronic book, among others. Further, the user tends to interact with other computers that are integrated into other devices. For example, the user's car likely has a computer that the user interacts with to get directions, listen to music, etc. Various user controls have been developed for these different types of computers. For instance, a mouse and a physical keyboard tend to be the most common way of interacting with and controlling a desktop computer. Mice were not convenient with notebook computers which tend to use a trackpad-type device instead. Neither mice nor trackpads were feasible with Smartphones and pad type computers which instead tend to have touch sensitive screens (e.g. virtual keyboards) which the user can contact to control the device.

Each of these control technologies has disadvantages. For instance, controlling devices by contacting the touch screen tends to make smudges all over the screen and/or is rendered inoperable if the user is wearing gloves. Potentially more importantly is that these control technologies do not lend themselves to use across all of the device types. As a result the user has to learn different techniques for controlling his/her different devices. For example, assume that in the course of a day the user listens to music on each of his/her computing devices and wants to turn off the music. When listening on the desktop the user likely uses the mouse to turn a music playing application from 'play' to 'stop'. The user may use the notebook's trackpad in a similar manner. In the car, the user may use a specific hardware switch to stop the music. On the Smartphone of the pad-type computer, the user may touch the 'stop' icon on the touch screen. This lack of continuity is inconvenient. Further, this inconvenience is magnified when the user tries to control a computer with which the user is unfamiliar. The present concepts relate to techniques that can be utilized to control a computer and can be readily applied to any (or all) computers, such as those listed above.

SUMMARY

The described implementations relate to user control gestures. One example allows a speaker and a microphone to perform a first functionality. The example simultaneously utilizes the speaker and the microphone to perform a second functionality. The second functionality comprises capturing sound signals that originated from the speaker with the microphone and detecting Doppler shift in the sound signals. It correlates the Doppler shift with a user control gesture performed proximate to the computer and maps the user control gesture to a control function.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent relates to utilizing user control gestures (hereinafter, "user gestures") to control computers. More specifically, the user gestures can be detected by the computer by emitting an audio signal and detecting the emitted signal. Any differences between the emitted signal and the detected signal can be analyzed to detect the user gesture based upon the Doppler effect or Doppler shift. Individual user gestures can be identified from the analyzed audio signal data. Individual user gestures can be mapped to specific control functionalities of the computer. The specific control functionality can be implemented to control the computer.

Use Case Examples

Figure 1:
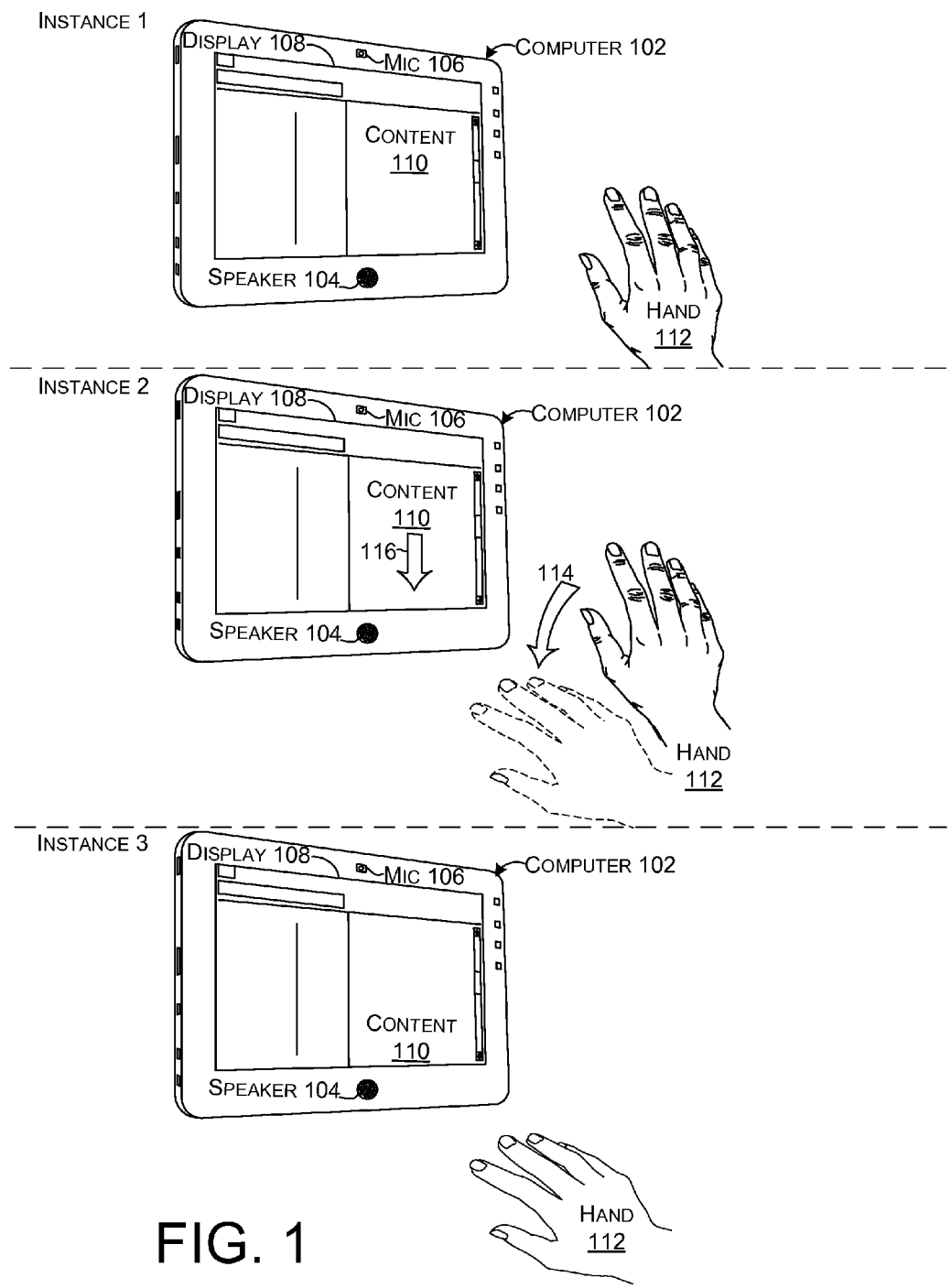
FIGS. 1-7 show examples of Doppler-based user control gesture detection scenarios in accordance with some implementations of the present concepts.

For purposes of explanation consider introductory FIG. 1, which shows a computer 102 manifest as a pad-type computer. Computer 102 includes a speaker 104, a microphone 106, and a display 108. In this example, content 110, such as text, is displayed on a portion of the display 108.

FIG. 1 is divided into instance 1 through instance 3 to help illustrate how a user can control the computer by making user gestures. During instances 1-3, computer 102 can generate an audio signal via speaker 104. The audio signal can be captured by microphone 106. The captured signal can be compared to the emitted signal for differences. These differences can be produced by the user gesture effect on the signal (e.g., its Doppler effect). Different user gestures create different Doppler effects and thus individual user gestures can be distinguished and identified.

In the illustrated case, the user gesture is a hand gesture made with the user's right hand 112. (In some implementations, the gesture could alternatively be performed with the left hand, which is not illustrated here to avoid clutter on the drawing page). In this example the user starts with the hand 112 generally parallel to the display 108 as illustrated in instance 1. The user then makes the user gesture (arrow 114) by tilting the hand downward as illustrated in instance 2. The user gesture 114 is detected by the computer 102 as a difference in the received signal from the emitted signal. State another way, the user gesture can cause changes to a frequency profile of the captured signal from what would otherwise be expected in the absence of the user gesture. This difference or change can be caused by the user's hand creating a Doppler shift on the received or captured signal. In this example, the computer maps the detected gesture to a 'scroll down command'. The computer then scrolls down the content 110 (arrow 116).

Instance 3 shows the user's hand 112 at the end of the gesture now generally perpendicular to the display 108. Also, the content 110 has been scrolled downward when compared to instance 1. Note also, that in instances 1-3 the user did not have to physically contact the computer to accomplish the control functionality.

As mentioned above, computer 102 includes a speaker 104 and a microphone 106. The speaker and microphone could be dedicated hardware devices that are utilized only for the user gesture detection functionality. However, such need not be the case. In fact most computers already include at least one microphone and at least one speaker. These existing hardware devices can be utilized to reduce costs and complexity associated with adding additional hardware devices. Further, the present gesture detection functionality can be achieved with the existing speaker and microphone without interrupting or diminishing existing uses of these devices. For instance, assume that in instance 1, the user is engaged in an ongoing telephone call (audio only) or web-chat (audio and video (while not shown for sake of brevity, computer 102 could include a camera)). Thus, during the telephone call audio signals are being played by speaker 104 from the other party and audio signals, such as the user speaking, are being captured by microphone 106. Simultaneously, the speaker can be emitting one or more audio signals for use in the gesture detection functionality. In some implementations, these audio signals can be a steady tone emitted at a frequency that the user cannot hear. For instance, most speakers can emit signals up to 22 k-24 k Hertz and most microphones can capture these signals. However, humans generally cannot hear anything above about 18 k-20 k Hertz. Thus, speaker 104 and microphone 106 can be simultaneously used for the telephone call and for user gesture detection, yet the user only hears a normal telephone call. When the user is not making a gesture the emitted gesture detection signal and the captured gesture detection signal are generally identical. For instance, a steady 20 k Hertz signal is emitted and received.

While the user is engaged in the telephone call the user can be looking at content 110. The user may want to see the content above content 110 and can make the user gesture 114 to scroll down. This movement changes the audio signal so that the captured signal is slightly different from the emitted gesture detection signal. This difference can be analyzed to determine the user's gesture (e.g., to distinguish between different gestures). The difference between the emitted gesture detection signal and the detected gesture detection signal diminishes once the gesture is completed. Despite the dual functionality performed by the speaker and the microphone, the user's telephone call progresses in a normal fashion (e.g., the user does not even need to be aware of the underlying gesture detection functionality that is simultaneously leveraging the speaker 104 and the microphone 106). In other examples, the user gesture may be utilized to effect and/or operate cooperatively with the first function. For example, the user gesture could be used to mute the telephone call or control the volume of the telephone call, among others.

Further, this user gesture detection implementation is not dependent on the condition of the user's hand. For instance, the user may have gloves on or the user's hand may be dirty or oily. Such conditions may hinder the ability of a touch-screen to detect user touches. However, the present implementations do not require user contact and can be unaffected by gloves, dirt, etc.

Further, the present user gesture recognition implementation can be readily applied to each of the user's computers so that the user can use the same user gestures to control his/her various computers. For instance, the user could use the illustrated user gesture to control his/her desktop computer, in-dash car computer, smartphone, and notebook computer (among others) in the same way that the user controlled pad type computer 102 in FIG. 1.

Figure 2:
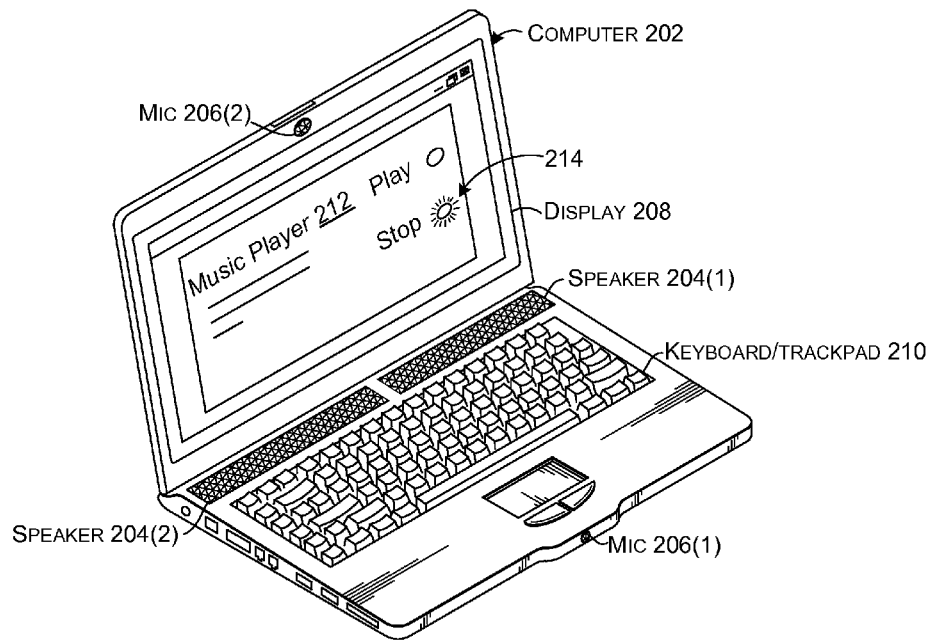

FIGS. 2-7 collectively show another Doppler-based user gesture detection implementation that relates to a computer 202. In this case, computer 202 is manifest as a notebook-type computer. Computer 202 includes two speakers 204(1) and 204(2), two microphones 206(1) and 206(2), a display 208, and a user input device manifest as a keyboard/trackpad 210. In this example, a music player application 212 is running on the computer. As shown in FIG. 2, the music player is in a "stop" condition (e.g., not playing) as indicated at 214. Assume that a Doppler-based user gesture detection feature is operating on the computer. For instance, the Doppler-based user gesture detection feature could be causing one or more signals to be emitted from one or both of the speakers 204(1) and 204(2) and for the signals to be captured by one or both of microphones 206(1) and 206(2). As described above relative to FIG. 1, the emitted and captured signals can be analyzed for differences and the differences can be identified as user gestures for controlling the computer.

Figure 3:
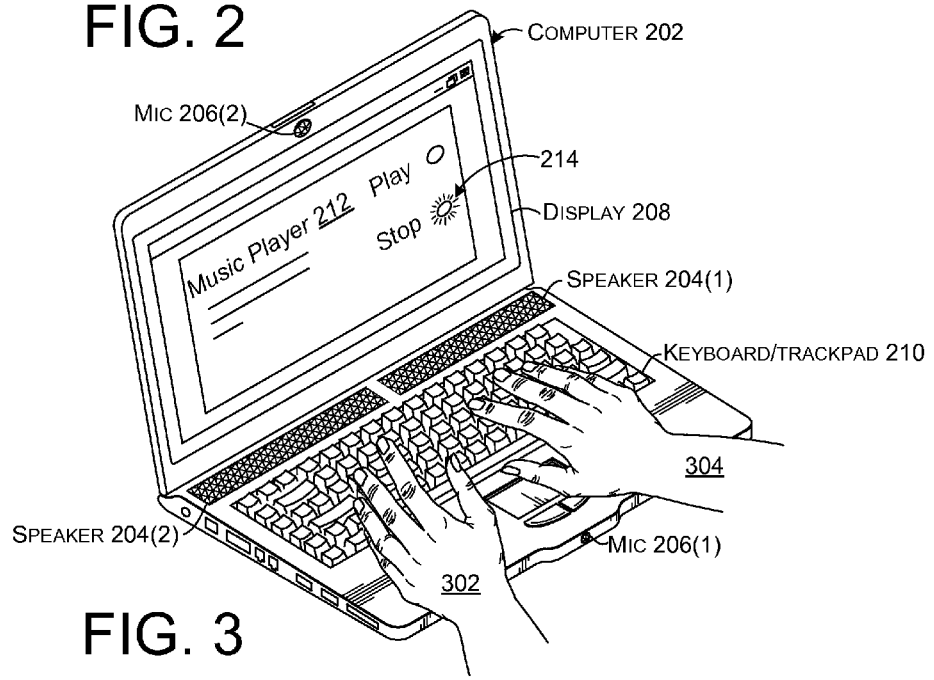

FIG. 3 shows a user engaging the keyboard/trackpad 210 with his/her left and right hands 302 and 304, respectively. In this implementation, engaging the keyboard/trackpad 210 inactivates the Doppler-based user gesture detection feature to avoid interpreting typing movements as user gestures. For instance, the Doppler-based user gesture detection feature may stop causing signals to be emitted from the speaker(s) or it may simply not analyze the captured signals when the user is engaging the keyboard/trackpad.

In other examples, the Doppler-based user gesture detection feature may operate cooperatively with other input mechanisms to provide control functionalities that are otherwise unavailable to the user or to make such control functionalities more user-friendly. For instance, in an un-illustrated example, in a 3-D application, the user may select an object with the trackpad. The user may then be able to 'drag' the selected object with the trackpad. Further, the user may be able to 'turn' or 'rotate' the selected object by performing the side-to-side control gesture described and illustrated above relative to FIG. 1. Of course this is just one example, and many other 'combination' control options can be mapped by the user to control the computer as desired with traditional input mechanisms in combination with Doppler-based user gesture detection.

Figure 4:
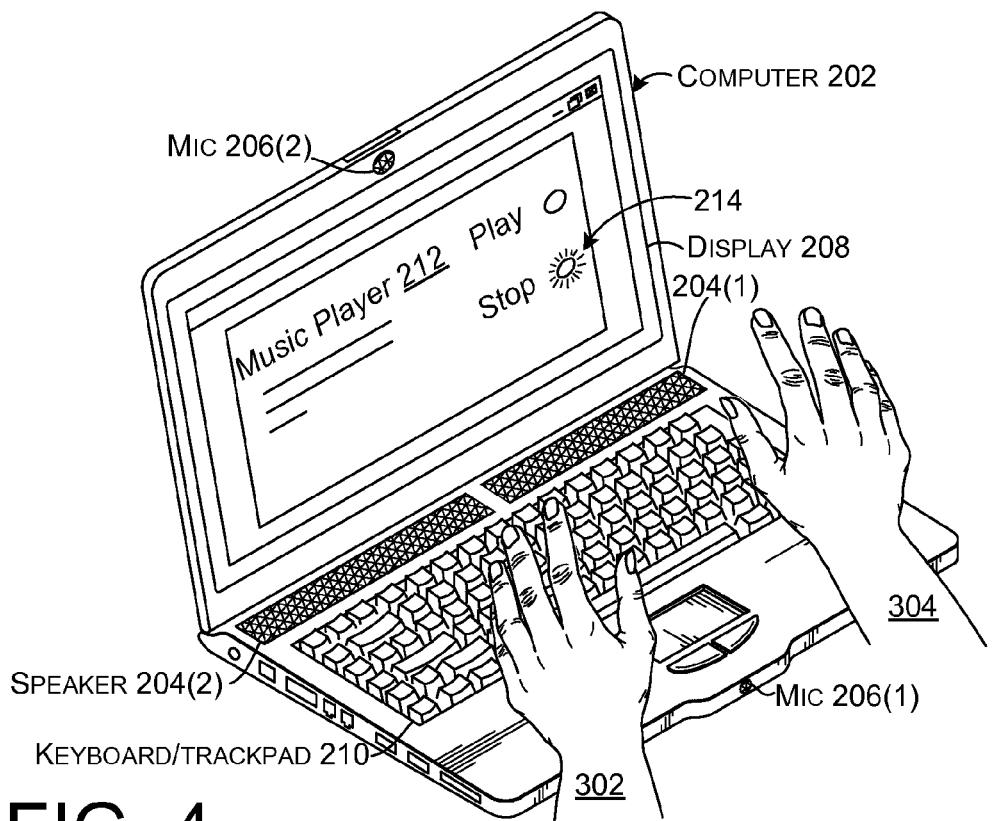
Figure 5:
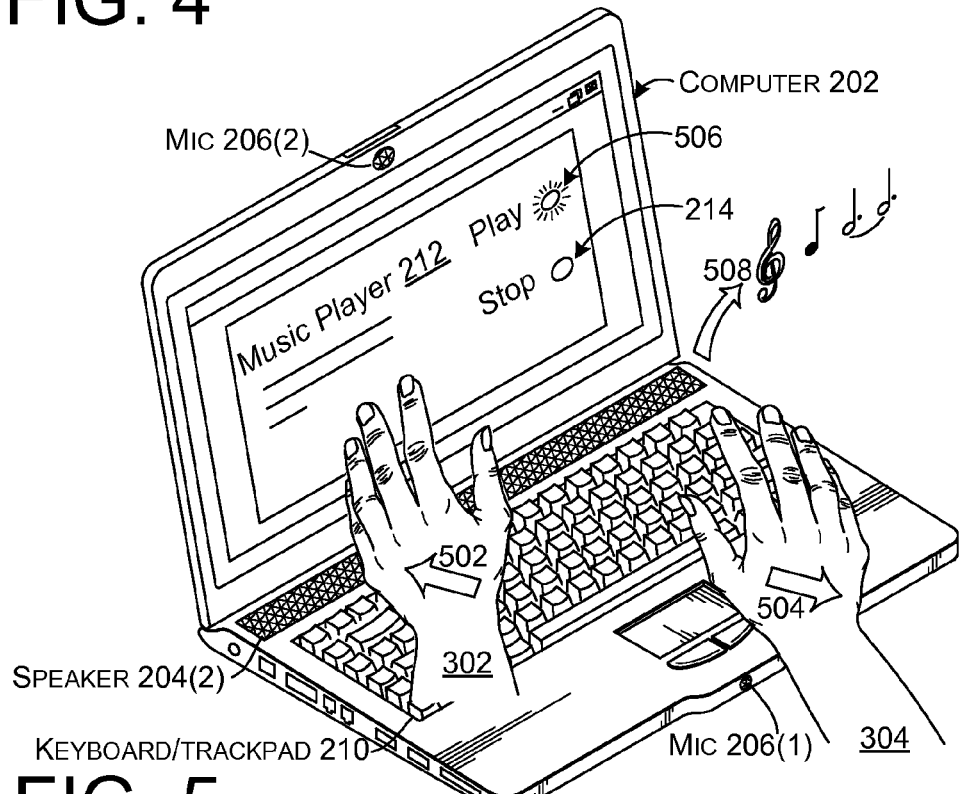

Continuing with the illustrated example, FIG. 4 shows a subsequent time where the user has disengaged from the keyboard/trackpad 210 (e.g., is no longer physically making key inputs or trackpad inputs). As such, the Doppler-based user gesture detection feature is once again activated. FIG. 5 shows the user moving his/her left hand 302 forward (toward the display 208) as indicated by arrow 502 and simultaneously moving his/her right hand 304 backward (away from the display 208) as indicated by arrow 504. This user movement effects the sound captured by speakers 204(1) and/or 204(2). This effect can be detected and identified by the Doppler-based user gesture detection feature as a user gesture. In this example, the user gesture is mapped to changing the state of the music player or music player application 212. As such, the Doppler-based user gesture detection feature causes the music player to go from the stop condition 214 of FIG. 4 to a "play" condition 506 of FIG. 5. As a result musical sounds are emitted from the speakers as indicated at 508.

Figure 6:
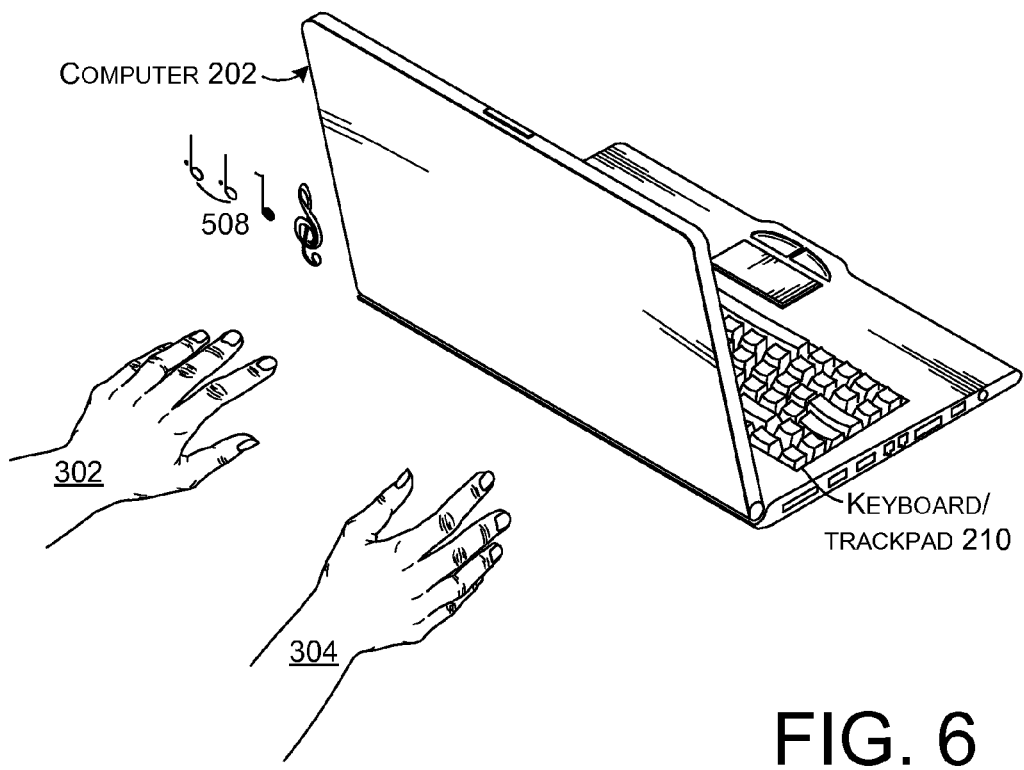
Figure 7:
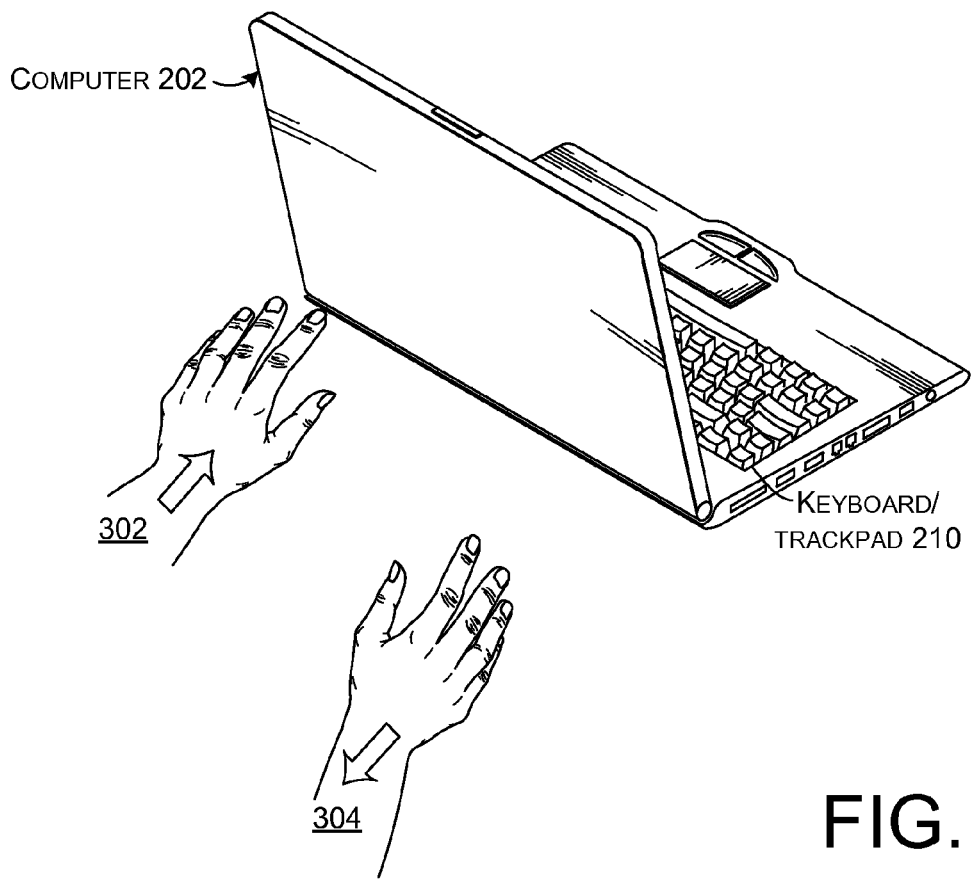

FIGS. 6-7 show a scenario where the user can control the computer 202 with a user gesture even though the user is not in front of the computer and is not in line of sight of the screen. In FIG. 6 as the user approaches computer 202, the computer is still outputting musical sounds as indicated at 508. The user can change the music playing status of the computer by repeating the user gesture discussed relative to FIGS. 4-5 that entails simultaneously moving one hand toward the computer and one hand away from the computer. In FIGS. 4-5 the user gesture caused the computer's music playing application to switch from a stopped state to a playing state. In FIG. 6, the computer is still in the playing state and repeating the user gesture switches the computer back to the stopped state. This is evidenced by the absence of musical notes emitted from the computer in FIG. 7. The user gesture can be recognized by the computer, and used to control the computer, without the user being in front of the computer or in line-of-sight of certain devices on the computer, such as camera devices. In fact, in some implementations, the user can control the computer from any direction or dimension as long as the user is within a defined range extending radially from the computer.

To summarize the discussion relative to FIGS. 1-7, the Doppler-based user gesture detection implementations detect motion around a computer and use properties of the detected motion, such as speed, direction, and/or amplitude, to recognize a rich set of user gestures. For instance, by tracking the direction and speed, a user gesture of moving the hand up or down can scroll a webpage in real-time. Doppler-based user gesture detection implementations can also detect two hands moving in opposite directions, among other detectable user gestures. The concepts can be implemented on any type of computer that has a microphone and a speaker. The microphone and the speaker need not be dedicated to gesture detection and can simultaneously perform other functions. The described implementations are robust and can perform satisfactorily in both busy and noisy environments and quieter environments. The concepts can be implemented across multiple different types of devices so that the user can control any of the devices with the same user gestures.

System Examples

Figure 8:
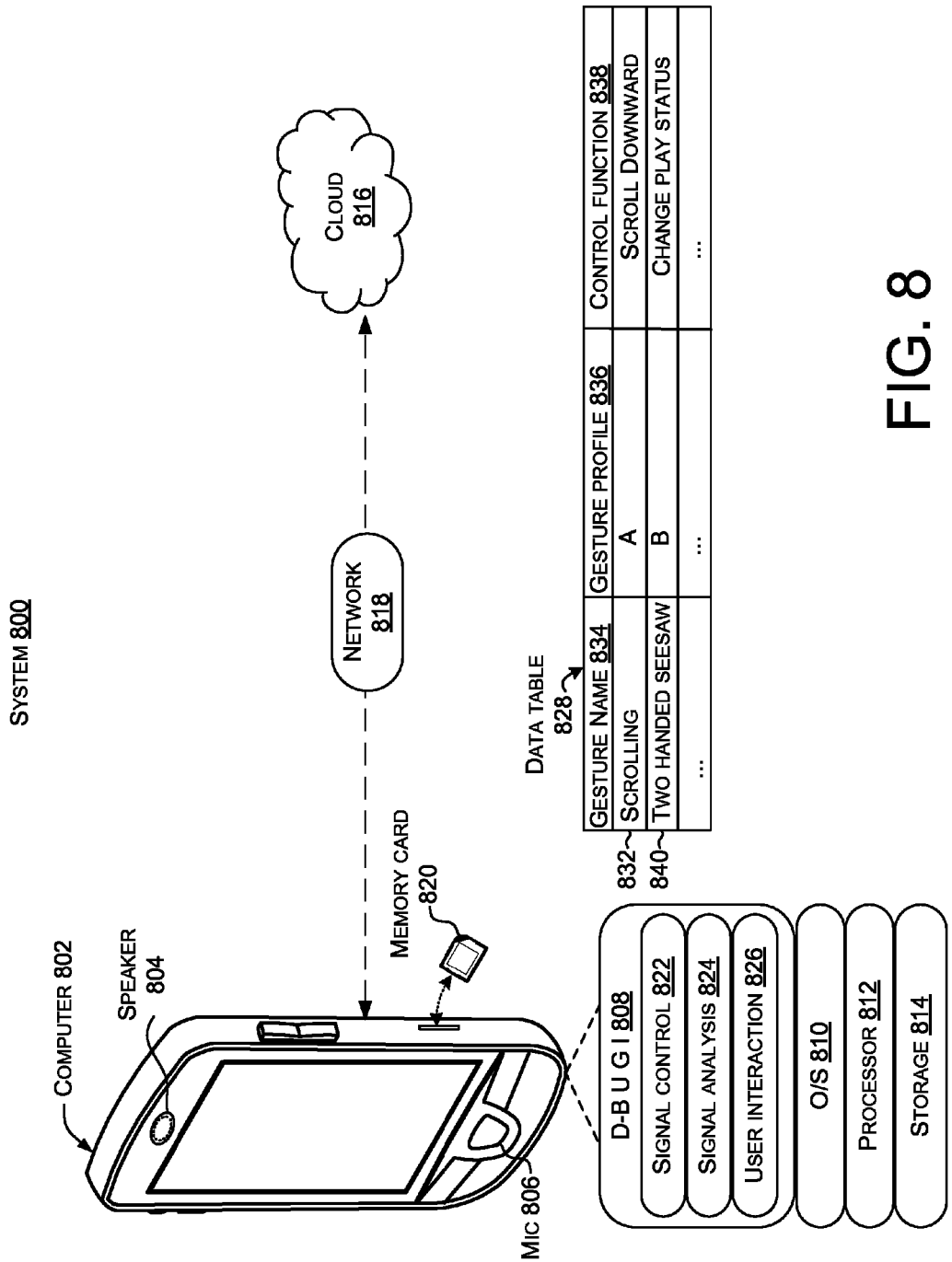
FIG. 8 shows an example system upon which Doppler-based user control gesture detection techniques can be employed in accordance with some implementations of the present concepts.

FIG. 8 shows an example of a system 800 that can accomplish the Doppler-based user gesture detection concepts introduced above. System 800 includes a computer 802, that in this case is manifested as a smartphone. In this example, the computer 802 includes a speaker 804, a microphone or mic 806, a Doppler-based user gesture identification component 808, an operating system 810, a processor 812, and storage 814. Doppler-based user gesture identification component 808 can be an application, an application part, or a part of the operating system 810.

Computer 802 can be configured to communicate with other computers and/or computing resources, such as computing resources located in the cloud 816 via network 818.

The term "computer" or "computing device" as used herein can mean any type of device that has some amount of processing capability and/or storage capability. Examples of computers can include traditional computing devices, such as personal computers, cell phones, smart phones, personal digital assistants, cameras, video cameras, or any of a myriad of ever-evolving or yet to be developed types of computing devices. Computers can also be components of a larger device. For instance, a dashboard computer is included in many newer cars.

Processing capability can be provided by one or more processors (such as processor 812) that can execute data in the form of computer-readable instructions to provide a functionality. Data, such as computer-readable instructions, can be stored on storage, such as storage 814. The storage can be internal and/or external to the computing device. For instance, memory card 820 can be thought of as storage that is removably received by the computer. The storage can include any one or more of volatile or non-volatile memory, hard drives, flash storage devices, and/or optical storage devices (e.g., CDs, DVDs etc.), among others. As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

Doppler-based user gesture identification component 808 can include and/or access a signal control module 822, a signal analysis module 824, a user interaction module 826, and a datatable 828.

Briefly, the signal control module 822 can control what signals are emitted for use by the Doppler-based user gesture identification component 808. The signal control module 822 can also control capturing the signals. The signal analysis module 824 can analyze the emitted and captured signals to identify user gesture induced Doppler shifts. The user interaction module 826 can provide interfaces, such as GUIs that explain to a user how to properly make pre-installed gestures and/or can allow the user to define individual gestures and to map the gestures to individual computer control commands. These mappings can be stored in the datatable 828.

Recall that Doppler-based user gesture identification component 808 can use the phenomenon known as the Doppler shift to sense motion. The motion can be detected as the shift in frequency of a sound wave in response to a moving object, an effect called the Doppler effect. This frequency shift is proportional to the velocity with which the object moves and the source frequency. In the present implementations, the original source (the speakers) and listener (the microphone) are stationary, thus in absence of any motion, there is no frequency change. When a user moves his/her hand, however, it reflects the sound waves, causing a shift in frequency. This frequency is measured by the microphone (fr) and can be described by the following equation, which can be employed by the signal analysis module 824.

$$f_r = f_t \cdot \left( \frac{c+v}{c-v} \right)$$

where,
$f_r$=perceived frequency at microphone;
$f_t$=original frequency from speaker;
c=speed of sound in air;
v=velocity of target/hand Signal control module 822 can generate a continuous pilot tone (or multiple pilot tones), played through the computer's speaker(s) 804. Generally high frequencies (typically in the range of 18-22 kHz on commodity audio systems) are employed so that the user does not hear the pilot tone. However, lower frequencies such as down to and below 6 kHz can be employed. Additionally, the higher the frequency, the greater the shift for a given velocity, which makes it computationally easier to estimate motion at a given resolution. The upper bound is largely a function of most laptop and phone speaker systems only being capable of producing audio at up to 22 kHz. Note also, that in some implementations, the signal control module may be configured to use signals associated with another functionality rather than generating a dedicated pilot tone. For instance, if the speakers are playing music for the user, frequency elements of the music can be utilized as the pilot tone. The emitted musical frequencies can then be compared to the captured frequencies to identify differences cause by user gestures.

Due to variations in hardware as well as filtering in speaker and microphone systems, signal control module 822 can, in some implementations, perform an initial calibration to find one or more performant (and potentially optimal) tone frequency(s) (no user intervention is required). In one implementation, it performs a 500 millisecond frequency sweep, and keeps track of peak amplitude measurements as well as the number of candidate motion events detected (i.e., potential false positives). Signal control module 822 can select the highest frequency at which minimum false events are detected and the peak is most isolated (i.e., the amplitude is at least 3 dB greater than next highest peak in the sweep range). Note that the frequency sweep can be repeated periodically and/or upon some other occurrence or according to various parameters. For instance, if at some point excessive noise (e.g., interference) is detected in the captured signal the frequency sweep may be repeated to look for a 'cleaner' frequency. For example, the noise can be compared to a predefined threshold. If the noise level exceeds the predefined threshold then the testing can be repeated. This testing and retesting of potential pilot tones can allow the Doppler-based user gesture detection techniques to perform satisfactorily in different and/or changing environments.

Further, the signal control module 822 may simultaneously emit multiple pilot tones, each at a different but steady frequency. The corresponding captured signals may all be analyzed for redundancy or to obtain more accurate results. Alternatively, one of the pilot tones can be characterized as 'better' or 'best' (e.g., cleaner) and may be selected for analysis.

With the high frequency pilot tone being emitted, any motion in proximity (around a one meter range depending on speed) of the computer 802 will cause Doppler shifted reflections to be picked up by the microphone, which is continuously sampled at 44,100 Hz, in one implementation.

In some implementations, the signal analysis module 824 can buffer the incoming time domain signal from the microphone 806 and compute Fast Fourier Transform (FFT) with 2048-point Hamming window vectors. This yields 1024-point magnitude vectors that are spread equally over the spectral width of 22,050 Hz. After each FFT vector is computed, it can be further processed by the signal analysis module 824. For instance, the signal analysis module can perform signal conditioning, bandwidth extraction, followed by motion detection, and finally feature extraction.

In some cases, signal conditioning can be thought of as utilizing testing data relating to how fast users can move their hands. Some implementations can operate on the assumption that the fastest speed at which users can move their hands in front of a computer is about 3.9 m/sec. Hence, such implementations can conservatively bound signals of interest at 6 m/sec. Given the described sampling rate and FFT size, this yields about 33 frequency bins on either side of the emitted peak. (Some implementations may operate on a presumption that faster movement is created by a user employing some type of pointing device to make the user gesture. For instance, a user can hold and move a ruler or pencil faster than the user can move his/her hand. This fast movement can be mapped to a separate control command).

The signal analysis module 824 can interpret shifted frequencies as user gestures. For instance, the signal analysis module can detect user gestures that effectively increase (or decrease) the bandwidth of the pilot tone (i.e., window averaging and spectral leakage blur the movement of the peak). To detect this, signal analysis module 824 can compute the bandwidth of the pilot tone by scanning the frequency bins on both sides independently until the amplitude drops below 10% of pilot tone peak. Stated another way, the present techniques do not need to analyze the entire frequency spectrum and can instead focus the analysis around the pilot tone (for instance 200 HZ on either side). Further, using a relative amplitude drop can allow the system to respond dynamically, such as when the user changes the volume of the speakers.

For most cases, this bin analysis is sufficient for inferring motion. However, if the shift is large enough, the reflected signal can separate from the pilot tone's peak rather than blurring the peak. To address this issue the signal analysis module 824 can perform a second scan, looking beyond the stopping point of the first scan. If a second peak with at least 30% energy of the primary tone is found, the first scan can be repeated looking for amplitude drops calculated from the second peak.

Motion Detection and Feature Extraction: In some implementations, the frequency vectors have a per-bin resolution of 21.5 Hz. With a pilot tone of 20 kHz this translates to detecting movements as slow as 18.5 cm/sec. The signal analysis module 824 can consider the bandwidth of the pilot tone itself, which with no motion can be ~80 Hz, for example. The pilot tone bandwidth can vary from 60-120 Hz (1-3 bins on either side of the tone) depending on the quality of the commodity hardware's sound system. Thus, signal analysis module 824 can consider a "motion event" to occur when there is a frequency shift bandwidth of 4 or more bins, for example. This threshold allows sufficiently slow movements of the hand to be detected while ignoring false positives due to variations in the bandwidth.

Measurable Properties

In addition to the fundamental frequency shift, signal analysis module 824 can also compute other useful features for inferring gestures.

Velocity: The measured frequency change is proportional to the absolute speed of the target. Signal analysis module 824 can measure the difference between the original (e.g., pilot tone) and reflected frequency to differentiate between slow, medium and fast gestures.

Direction: Determining whether the hand is moving towards or away from the computer can be made from the sign of shift in frequency. A positive shift indicates towards and negative shift indicates away. In multiple microphones scenarios the signal analysis module 824 can compare the detected Doppler shift differences for the multiple microphones to identify further information about the user control gesture.

Proximity and Size of Target: The amplitude of the observed signal increases as the target moves closer to the computer, and it also increases with size and reflectivity of the target. For example, a larger hand or open palm can manifest as larger amplitude than a smaller or fisted hand.

Time Variation: Measuring the variation of the above three properties over time allows signal analysis module 824 to observe both the rate of change and use it for filtering spurious signals. For example, any motion that lasts for a very short period of time can be reliably filtered out, while longer lasting motion events can be used to identify activities like walking towards or away from the computer.

Gestures and Use Cases

The features described above can be combined to form complex gestures. For instance, as described above relative to FIG. 1, scrolling can be effectively detected and used to control a web-browser or word processing application, among others. Some implementations can employ a clutching mechanism to reduce and/or prevent inadvertent scrolling as the hand returns to a particular position. For example, using the velocity feature and scrolling only when it meets a certain speed criteria can make this possible.

Double Tap or Tapping Gesture: By observing the change in direction over time, the 'frequency' at which the direction is changing can be computed. The value of this direction frequency can be used for detecting tap gestures, which can be further used to distinguish quick taps, much like a mouse double-click, from slower taps.

The two handed seesaw gesture was illustrated relative to FIGS. 2-7 and entails moving both hands in opposite directions at the same time to activate the gesture. It is detected by the presence of both shifted up and down frequency components in the same FFT vector.

Proximity and Flick: This gesture is activated when at least N-consecutive motion events in the same direction are detected. A large N can signify whether a person is walking (as opposed to moving the hand which has a predictably smaller N consecutive motions). The walking gesture can be used to automatically put a computer to sleep or wake it up as a user walks away or towards it. The above listing of detectable gestures is provided for purposes of explanation and many other user gestures can be detected.

The user interaction module 826 can set up the user gestures on the computer. For instance, some implementations could come with one or more predefined user gestures. In such a case, the user interaction module may cause an interface, such as a graphical user interface (GUI) to be generated that explains and/or shows the user how to make individual user gestures. The user interaction module may also allow the user to define what computer control to map to the user gesture. For instance, the GUI may show how to make the scroll gesture shown in FIG. 1.

The GUI can then allow the user to map the user gesture to a computer control function of his/her choosing. One such example is evidenced in horizontal row 832 of datatable 828. The datatable includes a gesture name column 834, a gesture profile column 836, and a control function column 838. In row 832, the gesture name is 'scrolling' and the gesture profile is 'A'. The 'A' represents the graphed frequency profile recorded for the gesture, which is not illustrated for sake of brevity. In this case, the scrolling gesture is mapped to the control function of 'scroll downward', which as mentioned above and is user adjustable. For instance, the user might change the corresponding control function to 'decrease volume' on the music player application described relative to FIG. 1.

In another example, assume that the user wants to 'teach' the user a new gesture. The GUI can offer this feature. For instance, the GUI may instruct the user to perform the user gesture one or more times. The user interaction and/or the signal analysis modules 826 and 824 can analyze the signals during the user gesture performance until a satisfactory gesture profile is obtained. For instance, assume that the user performs the two handed seesaw gesture illustrated relative to FIGS. 2-7 above. The signal analysis module 824 can identify the gesture profile as 'B' as indicated in row 840 of the datatable. The user interaction module 826 can allow the user to define the corresponding control function, such as by providing a listing of control functions for the user. In this case, assume that the user selected 'change play status' of the music player.

At a subsequent point in time, the user may want to control the computer 802 and may perform a user gesture. The user gesture can be captured and analyzed by the signal analysis module 824 to determine if the captured gesture profile of the performed gesture matches (or approximately matches as defined by a similarity threshold) any of the gesture profiles in data table 828. If there is an approximate match, the corresponding control function (e.g., from the horizontal row of the matching gesture profile) can be performed.

In some implementations, if excessive amounts of incorrect approximate matches are made, the user can adjust the similarity threshold upward. In the opposite case where the gestures are not identified as matches, the user can adjust the similarity threshold downward via the user interaction module 826.

Additionally, the user interaction module 826 can allow the user to set and/or adjust a range of detection. For instance, the user can set a threshold amplitude value, such that only occurrences in a frequency profile that exceed the amplitude threshold are mapped to the datatable 828. Alternatively, the user may adjust the volume of the speakers, which in turn controls the loudness (e.g. amplitude) of the emitted pilot tone. The volume control can be used to regulate the effective detection range, which could be useful in crowded situations in which the user may explicitly not want to pick up ambient movement.

In some implementations, the Doppler-based user gesture identification component 808 can be pre-installed on the computer 802 by a manufacturer or an intermediary that prepares and/or sells the computer to an end user (e.g., customer). In other implementations, the Doppler-based user gesture identification component 808 can be installed by the user. For instance, the user may download the Doppler-based user gesture identification component over network 818 as a set of computer-readable instructions that are then stored on the computer in a tangible form, such as on storage 814. In another implementation, the user may obtain the Doppler-based user gesture identification component on a storage device such as memory card 820 to install the Doppler-based user gesture identification component on his/her computer.

Further, in the illustrated implementation, computer 802 is configured with a general purpose processor 812 and storage 814. In some alternative configurations, the computer can include a system on a chip (SOC) type design. In such a case, functionality provided by various components of the computer can be integrated on a single SOC or multiple coupled SOCs. In one such example, the computer can include shared resources and dedicated resources. An interface(s) can facilitate communication between the shared resources and the dedicated resources. As the name implies, dedicated resources can be thought of as including individual portions that are dedicated to achieving specific functionalities.

Shared resources can be storage, processing units, etc. that can be used by multiple functionalities. In this example, the shared resources can include the processor.

Method Examples

Figure 9:
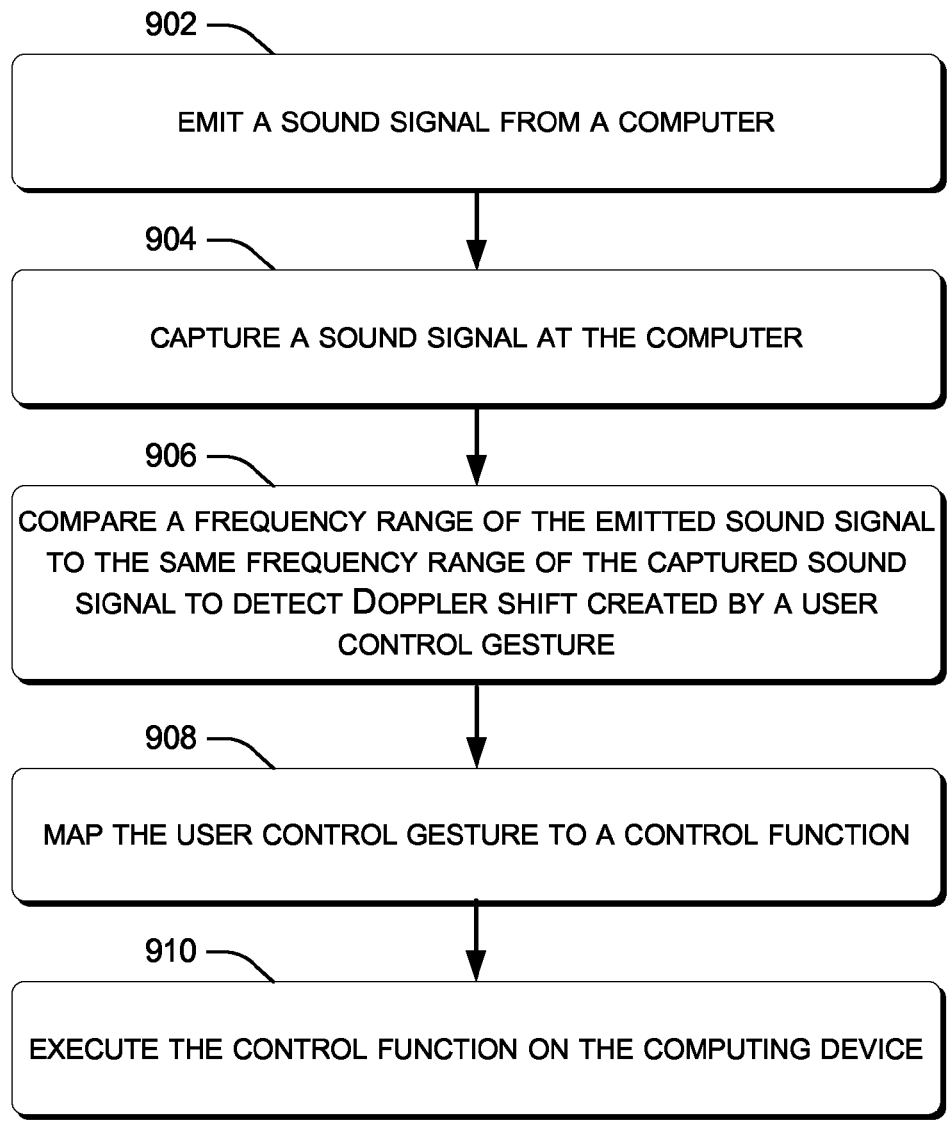
FIG. 9 is a flowchart of an example of a Doppler-based user control gesture detection method or technique in accordance with some implementations of the present concepts.

FIG. 9 illustrates a flowchart of a technique or method 900 that is consistent with at least some implementations of the present concepts.

At block 902, the method can emit a sound signal from a computer. The sound signal can be emitted from speaker(s) on the computer. In some implementations, these speaker(s) can be existing multipurpose speakers that can be utilized to achieve other functionalities on the computer.

At block 904, the method can capture the sound signal at the computer. The sound signals can be captured with microphone(s). In some implementations, the microphones can be existing multipurpose microphones that can be utilized to achieve other functionalities on the computer.

At block 906, the method can compare a frequency range of the emitted sound signal to the same frequency range of the captured sound signal to detect Doppler shift created by a user control gesture.

At block 908, the method can map the user control gesture to a control function.

At block 910, the method can execute the control function on the computing device.

The order in which the above-mentioned methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computer causes the computer to perform the method.

CONCLUSION

Although techniques, methods, devices, systems, etc., pertaining to Doppler-based user gesture detection are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc. Also, as used in this document the terms "a" and "an" are intended to introduce an element, which may be singular or plural. Therefore, "a" or "an" can be used to cover both the singular sense (e.g., one) and the plural sense (e.g., multiple).

The invention claimed is:

1. A computer, comprising:
   a speaker and a microphone; and,
   a gesture identification component configured to cause sounds of a given frequency to be emitted from the speaker and captured by the microphone, the gesture identification component further configured to evaluate the captured sounds around the given frequency to detect Doppler effect shifts caused by user gestures, the gesture identification component further configured to map an individual Doppler effect shift to an individual control function and to cause the individual control function to be executed by the computer, and wherein the gesture identification component is further configured to allow the speaker and the microphone to perform other functions during the emitting and capturing.

2. The computer of claim 1, further comprising a user input device and wherein the gesture identification component is further configured not to evaluate the captured sounds when a user is engaging the user input device.

3. The computer of claim 2, wherein the user input device comprises a physical keyboard, a virtual keyboard, a mouse, a track pad, or a touch screen.

4. The computer of claim 1, wherein the speaker comprises a single speaker or multiple speakers and the microphone comprises a single microphone or multiple microphones.

5. The computer of claim 1, wherein the gesture identification component is further configured to allow a user to define a detection range from the computer within which the individual control function is to be executed and outside of which the individual control function is not to be executed.

6. The computer of claim 5, wherein the gesture identification component is further configured to evaluate an amplitude of the individual Doppler effect shift to determine whether the user gestures occurred within the detection range.

7. The computer of claim 5, wherein the detection range extends radially in three dimensions from the computer.

8. The computer of claim 1, wherein the other function of the speaker is playing music and wherein the sounds of the given frequency comprise a portion of the music.

9. The computer of claim 1, wherein the gesture identification component is configured to test a range of frequencies and evaluate corresponding captured sounds from the range of frequencies and to select the given frequency when interference associated with the given frequency is relatively less than other frequencies of the range of frequencies.

10. The computer of claim 9, wherein the interference comprises other sounds generated by the speaker or background noise.

11. The computer of claim 9, wherein the gesture identification component is configured to retest the range of frequencies according to one or more parameters.

12. The computer of claim 11, wherein the one or more parameters relate to a predefined period of time or relate to detected interference at the given frequency exceeding a predefined threshold.

13. A computer-readable storage media having instructions stored thereon that when executed by a processor of a computing device cause the computing device to perform acts, comprising:
   simultaneously emitting a sound signal at a constant frequency and other sound signals from a single speaker set of the computing device;
   capturing sound at the computing device;
   comparing a frequency range of the emitted sound signal to the same frequency range of the captured sound to detect Doppler shift created by a user control gesture;
   mapping the user control gesture to a control function; and,
   executing the control function on the computing device.

14. The computer-readable storage media of claim 13, embodied on the computing device.

15. The computer-readable storage media of claim 13, wherein the capturing is performed by multiple microphones and further comprising comparing detected Doppler shift differences for the multiple microphones to identify further information about the user control gesture.

16. The computer-readable storage media of claim 15, wherein the comparing the detected Doppler shift differences for the multiple microphones to identify further information about the user control gesture comprises determining whether the user control gesture was a single hand gesture or a two handed gesture.

17. The computer-readable storage media of claim 13, wherein the comparing comprises utilizing the Doppler shift to identify the user control gesture from other user control gestures that create other Doppler shifts.

18. A computer-readable storage media having instructions stored thereon that when executed by a computing device cause the computing device to perform acts, comprising:
   allowing a speaker and a microphone to perform a first functionality;
   simultaneously utilizing the speaker and the microphone to perform a second functionality, the second functionality comprising:
      capturing sound signals that originated from the speaker with the microphone;
      detecting Doppler shift in the sound signals;
      correlating the Doppler shift with a user control gesture performed proximate to the computing device; and,
      mapping the user control gesture to a control function.

19. The computer-readable storage media of claim 18, wherein the first functionality comprises a telephone functionality.

20. The computer-readable storage media of claim 18, wherein the control function relates to the first functionality.

21. A method, comprising:
emitting a sound signal from a computer;
capturing sound at the computer;
comparing a frequency range of the emitted sound signal to the same frequency range of the captured sound to detect Doppler shift created by a user control gesture;
utilizing the Doppler shift to identify the user control gesture from other user control gestures that create other Doppler shifts;
mapping the user control gesture to a control function; and,
executing the control function on the computer.

22. A system, comprising:
a processor;
a speaker and a microphone coupled to the processor;
the processor configured to utilize the speaker and the microphone to perform a first functionality;
the processor further configured to utilize the speaker and the microphone to perform a second functionality, the second functionality comprising:
  capturing sound signals that originated from the speaker with the microphone;
  detecting Doppler shift in the sound signals;
  correlating the Doppler shift with a user control gesture performed proximate to the speaker;
  mapping the user control gesture to a control function; and,
  executing the control function on the system.

23. The system of claim 22, embodied as a single computer.

24. The system of claim 23, wherein the single computer comprises a smartphone type computer, a pad type computer, or a notebook type computer.

* * * * *